May 22, 1951     S. D. MORRISON     2,554,417
SANITARY WATER COOLER
Filed Dec. 29, 1949
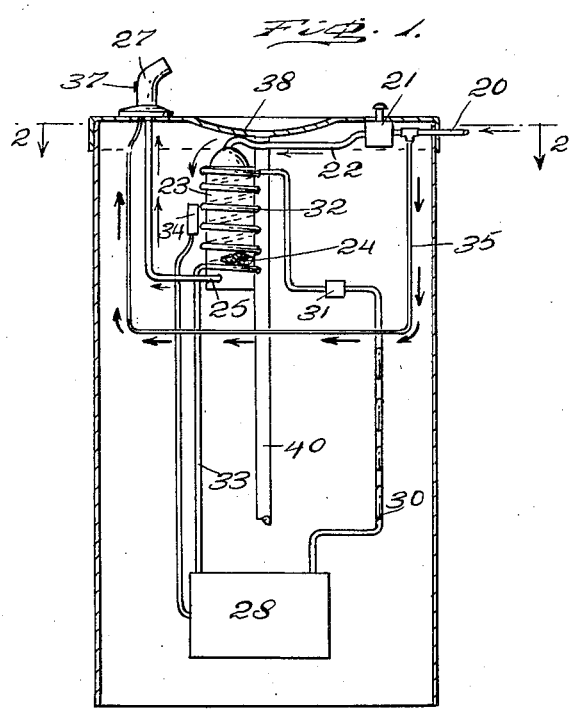
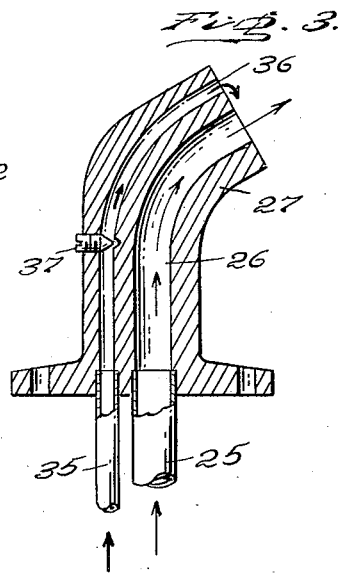
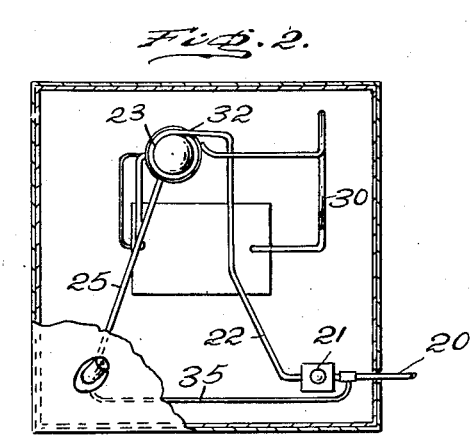
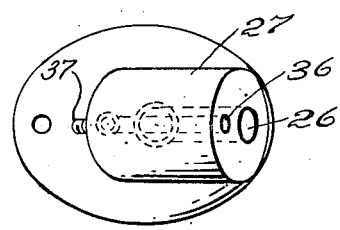
INVENTOR
SAMUEL D. MORRISON, DECEASED,
ELLA P. MORRISON, EXECUTRIX.
ATTORNEYS.

Patented May 22, 1951

2,554,417

UNITED STATES PATENT OFFICE 2,554,417

SANITARY WATER COOLER

Samuel O. Morrison, deceased, late of Media, Pa., by Ella P. Morrison, executrix, Media, Pa., assignor to Sunroc Refrigeration Company, Dover, Del., a corporation of Delaware Application December 29, 1949, Serial No. 135,711

2 Claims. (Cl. 62—141)

The present invention relates to water coolers or drinking fountains of the type which are provided with mechanical refrigeration.

A purpose of the invention is to flush the external dispensing end of the dispenser with drinking water containing available chlorine, while filtering the main supply of drinking water to the dispenser through a filter absorbing available chlorine.

A further purpose is to render available chlorine present in the flushing stream notwithstanding that the availability of chlorine in the filtered water will depend upon the time of exposure of the filtered water to the filter.

Further purposes appear in the specification and in the claims.

In the drawings it was chosen to illustrate one only of the numerous embodiments in which the invention may appear, selecting the form shown from the standpoints of convenience in illustration, satisfactory operation and clear demonstration of the principles involved.

Figure 1 is a fragmentary diagrammatic central vertical section of a water cooler embodying the principles of the invention, the filter casing being broken away to show the filter medium.

Figure 2 is a top plan, partly in section, on the line 2—2 of Figure 1.

Figure 3 is a central vertical section of the dispenser shown in Figures 1 and 2.

Figure 4 is a top plan of the dispenser of Figure 3.

Describing in illustration but not in limitation and referring to the drawings:

In accordance with the copending application Serial No. 650,437, filed February 27, 1946, for Filter and Temperature Control, water passing to a dispenser such as a bubbler or drinking fountain of a water cooler is filtered through a filter and desirably also cooled in the filter. The filter desirably employs a filtering medium such as activated carbon, which is a chlorine absorber, so that in passing through the filter, and in any case in prolonged contact with the filter medium, the residual chlorine normally carried in domestic drinking water supplies is greatly reduced or removed. This results in improving the taste of the water, especially in places where very high chlorine residuals are carried, but it has the serious disadvantage that the water contains no agent which can protect against contamination of the dispenser by bacteria or the like derived from the air or from previous users.

In accordance with the present invention a by-pass stream of water containing available chlorine is provided to flush the dispenser, the flushing stream desirably being small compared to the dispensing stream so that it will not appreciably impair the taste or pleasure in drinking the water which has been purified by the filter.

The inlet water is supplied through a connection 20 from a domestic water system and contains available chlorine normally in the domestic system. The inlet water for the main drinking water supply passes preferably through an inlet control valve 21 operated by the hand or foot of the user, and then through a pipe 22 to the interior of a filtering casing 23 containing activated carbon 24, leaving the filter at the discharge end through a pipe 25 connected to the dispensing passage 26 of a bubbler or other dispenser 27.

The filter may be of any suitable construction such as that described in the copending application aforesaid, which is incorporated herein by reference, or may be of any commercial character containing a chlorine absorber such as activated carbon or an alkali.

The filter may also function as a heat exchanger according to the principles of the copending application above referred to, in which case a motor compressor unit 28 supplies refrigerant to a condenser 30 and then to a constrictor 31 and finally to an evaporator 32 desirably surrounding the casing of the filter in heat transfer relation. Pipe 33 returns the refrigerant to the exhaust side of the motor compressor. A thermostatic control 34 starts and stops the motor compressor in response to the temperature of the heat transfer unit as well known.

At a suitable point in the water system prior to the filtering, a by-pass pipe 35 is led off to a bleed passage 36 of the dispenser, opening so that the bleed stream will flow down over the forward end of the dispenser and over the dispensing opening. The bleed is controlled, to provide a few drops per minute or other low rate of discharge, by an adjustable valve 37.

The bleed desirably is taken off before the inlet valve 21 so that it will flow continuously and keep the dispenser clean, discharging a few drops per minute into a catch basin 38 to a drain 40. This of course is small compared to the dispenser main stream.

It will be evident that, notwithstanding that water remaining for any substantial time in the filter will be substantially depleted in chlorine contact, and water even passing through the filter will have the chlorine content greatly reduced, the water in the bleed retains its chlorine content substantially unimpaired.

In view of the invention and disclosure, variations and modifications to meet individual whim or particular need will doubtless become evident to others skilled in the art, to obtain all or part of the benefits of the invention without copying the structure shown, and all is therefore claimed insofar as will fall within the reasonable spirit and scope of the claims.

Having thus described the invention what is claimed as new and desired to secure by Letters Patent is:

1. In a water cooler, a dispenser having a dispensing nozzle and a flushing nozzle adapted to direct water on the dispensing nozzle, a connection to a source of drinking water containing available chlorine, a filter containing a chlorine absorber, piping from the connection to the source through the filter to the dispensing nozzle of the dispenser and by-pass piping from the connection to the flushing nozzle of the dispenser by-passing the filter.

2. In a water cooler, a dispenser having a dispensing passage and a flushing passage adapted to direct water on the discharge end of the dispensing passage, a filter containing a chlorine absorber, mechanical refrigeration means for cooling the filter, a connection to a source of domestic drinking water containing available chlorine, piping from the connection to the source through the filter to the dispensing opening of the dispenser and by-pass piping from the connection to the source to the flushing passage of the dispenser.

ELLA P. MORRISON,
*Executrix of the Estate of Samuel O. Morrison, Deceased.*

REFERENCES CITED

The following references are of record in the file of this patent:

UNITED STATES PATENTS

| Number | Name | Date |
|---|---|---|
| 1,890,969 | Chaney | Dec. 13, 1932 |
| 1,960,975 | Mulch | May 29, 1934 |
| 2,071,631 | Hildebrand | Feb. 23, 1937 |